Nov. 12, 1968   D. E. HOCHBAUM   3,409,936
APPARATUS FOR SKINNING AN ANIMAL
Filed May 31, 1966
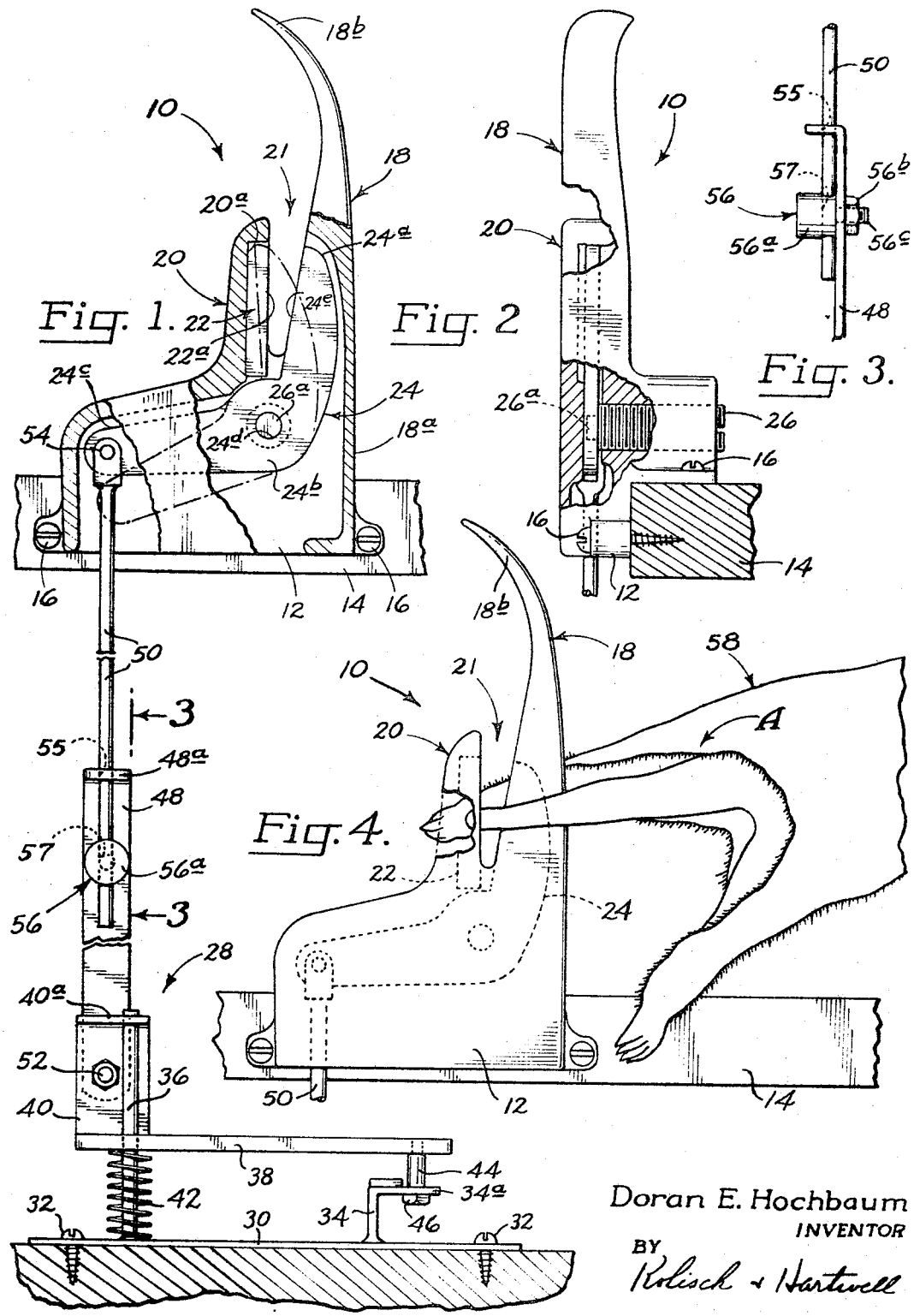
Doran E. Hochbaum
INVENTOR
BY
Kolisch + Hartwell
Attys.

United States Patent Office 3,409,936
Patented Nov. 12, 1968

3,409,936
APPARATUS FOR SKINNING AN ANIMAL
Doran E. Hochbaum, Rte. 1, Box 6,
Newberg, Oreg. 97132
Filed May 31, 1966, Ser. No. 553,840
9 Claims. (Cl. 17—21)

ABSTRACT OF THE DISCLOSURE

Apparatus for skinning an animal including an elongated curved prong which is insertable between, and operable to separate, the pelt and the flesh and bone portion of an animal's leg, and a movable knife which may be moved from a shielded position within the prong laterally outwardly to cut through the flesh and bone portion of the leg.

---

This invention relates to a skinning method and apparatus, and more particularly, to such a method and apparatus for skinning a small animal, such as a mink.

In preparing small animal pelts for sale, it is desirable, in order to obtain economical operation, to remove the pelts from the animals as easily and as rapidly as possible. It is also desirable to remove the pelts with as little damage and loss of pelt as possible.

In the past, however, these objectives have been difficult to attain. One problem encountered is in removing a pelt from an animal in the regions of the legs. With known skinning apparatus, the pelts are first separated from the flesh and bone portions of the legs by a suitable separating device. Then, in a completely separate operation, the animals are moved to some form of cutting device which is used to cut through the flesh and bone portions of the legs adjacent the paws to free a pelt completely from the leg regions leaving the pelt with the paws attached. This procedure, where the animal is moved from one device to another for separate operations, is time consuming and complicated. Where these steps are performed in haste, some of the pelt is lost in the cutting operation. This results in waste and reduced value of the pelt.

A general object of the present invention, therefore, is to provide a novel method and apparatus for removing a pelt from an animal, rapidly and easily, and without wasting portions of the pelt.

More particularly, an object is to provide such a method and apparatus where separation of the pelt in the leg regions is facilitated.

A related object is to provide skinning apparatus which includes an elongated element for separating a pelt from the flesh and bone portion of an animal's leg along the length thereof, and for then holding the pelt separate from said portion, and a knife adjacent one end of this element which may be operated to cut through the flesh and bone portion of the leg without cutting the pelt.

Another object is to provide such apparatus wherein the elongated element includes a prong which is curved to conform to the curvature of an animal's leg, thus to facilitate separation of the pelt.

A further object is to provide apparatus of the type described including a knife, wherein, with a pelt held separate from the flesh and bone portion of a leg, the knife may be actuated to move through the leg flesh and bone in a direction extending away from where the pelt has been separated. With such an arrangement, it has been found that there is a minimum risk of inadvertently cutting portions of the pelt.

Yet another object is to provide such apparatus wherein cutting may be controlled by one's foot, thus freeing one's hands to manipulate the animal being skinned.

These and other objects and advantages attained by the invention will become more fully apparent as the description which follows is read in conjunction with the accompanying drawings, wherein:

FIG. 1 is a side elevation of skinning apparatus as contemplated herein, with portions broken away to illustrate details of construction;

FIG. 2 is a view taken from the right side of FIG. 1 illustrating a portion of the apparatus shown in FIG. 1;

FIG. 3 is a a view taken along the line 3—3 in FIG. 1; and

FIG. 4 illustrates portions of the apparatus shown in FIGS. 1 and 2, as it would be used in skinning an animal.

Turning now to the drawings, and referring first to FIGS. 1 and 2, apparatus as contemplated herein is shown generally at 10. The apparatus comprises a unitary housing 12, which may be mounted on the edge of a suitable table 14 by means of screws 16.

Formed integrally with the housing are a pair of elongated upright elements 18, 20. Element 18, while having a substantially uniform width along its length, tapers in thickness progressing upwardly from a relatively thick lower end 18a, as best seen in FIG. 1. Adjacent its lower end, element 18 has a recess 18c which faces element 20. Upper end 18b of the element curves to the left as seen in FIG. 1, which curvature substantially corresponds to the cross-sectional curvature of an animal's leg and is present to facilitate separating of the pelt. The upper end also has a curving projection extending at 90° to the first described curvature, as seen in FIG. 2, which further facilitates skinning.

Element 20, also referred to herein as a guard, is spaced from element 18 and defines in conjunction with element 18 a notch 21. A recess 20a in element 20 faces recess 18c of element 18.

Mounted within housing 12 is cutting means comprising a pair of cutters or knives 22, 24. This cutting means is utilized in severing the flesh and bone portion of an animal's leg adjacent its paw, whereby the paw and pelt around the leg may be separated from the remainder of the leg.

Considering in more detail knife 22, this comprises an elongated piece which, in the embodiment illustrated, is squared-off at top and bottom ends, and suitably secured in place within recess 20a. The knife has an edge 22a exposed along one side of notch 21 which functions as a cutting edge for the knife.

Cutter 24, which is a movable cutter, comprises a knife blade 24a, a hub 24b and an arm 24c. Extending through the hub is a bore 24d. The cutter is mounted in place within the housing by a screw 26 having a pin portion 26a extending from one end thereof which passes through bore 24d, and functions as a journal for the cutter. When not performing a cutting operation, the cutter occupies the position shown in solid outline in FIG. 1, with knife blade 24a lodged within recess 18c. In a cutting stroke arm 24b is pulled downwardly to pivot the cutter about the pivot axis provided by journal 26a. With such pivotal movement, the knife blade swings to the left and across knife blade 22 to the protruding position illustrated in dashed outline in FIG. 1. Knife blade 24a includes an edge 24e, which on such swinging movement of the cutter moves past edge 22a of cutter 22 in a shearing stroke.

Mechanism for actuating cutter 24 in a cutting stroke is indicated generally at 28. This mechanism includes a base 30 which is screwed to the floor below table 14 by means of suitable screws 32. Welded on top of the base adjacent one end is an L-shaped stop 34, and welded adjacent the other end is an upright guide bar 36.

The mechanism further includes an elongated foot pedal 38 which is disposed directly over the base. Joined to the left-hand end of this foot pedal is an elongated upright member 40 which has a horizontal flange 40a adjacent its upper end. Guide bar 36 is slidably received in suitable aligned bores in the left-hand end of the foot pedal and in flange 40a. The foot pedal is supported above base 30 by means of a spring 42 which is interposed as shown between the base and the foot pedal.

Suitably fastened on the right-hand end of the foot pedal in FIG. 1 is a downwardly projecting guide bar 44. This guide bar is slidably received in a suitable bore in flange 34a of stop 34. A nut 46 is screwed onto the lower end of guide bar 44 below flange 34a to limit the vertical travel of the guide bar.

Referring to FIGS. 1 and 3, mechanism 28 is connected to cutter 24 by means of an elongated link 48 and an elongated connecting rod 50. The lower end of link 48 is pivotally connected at 52 to upright member 40. The upper end of connecting rod 50 is pivotally connected at 54 to arm 24c of cutter 24. The lower end of the connecting rod extends through a bore 55 in horizontal flange 48a of link 48, and through a bore 57 provided in head 56a of a clamping assembly 56. In the embodiment shown, the clamping assembly includes a threaded shank 56c which extends through a suitable bore in link 48, and a nut 56b which is screwed onto one end of this shank. The nut may be tightened on the shank to clamp the lower end of the connecting rod to link 48. The assembly is provided to permit on loosening vertical adjustment of the connecting rod relative to the link.

When the foot pedal is stepped upon, it causes cutter 24 to move in its previously mentioned cutting stroke, with knife blade 24a moving toward knife blade 22. When pressure on the foot pedal is relaxed, spring 42 causes the foot pedal to return to the position in which it is shown, and thus causes cutter 24 to return to its normal position.

Considering now how the described apparatus may be employed in skinning small animals, and with reference particularly to FIG. 4, the rear portion of a small animal, such as a mink, is indicated generally at 58. The rear of the animal is prepared for skinning by slitting the pelt beginning at the paw of one leg along the inside of the leg, thence slitting across the crotch, and finally continuing the slitting along the inside of the opposite leg until the paw is reached.

By manipulating the animal by hand, curved portion 18b of element 18 is then forced between the pelt and the flesh and bone portion of a leg in a region adjacent the top of such leg, such as region A. This separates the pelt in this region. With the pelt thus separated the animal is then moved in such a direction to cause element 18 to move along the length of the leg from region A to adjacent the paw. This causes the pelt to separate from the flesh and bone portion of the leg substantially along the leg's entire length.

The leg is then pushed down along element 18 until it extends well into notch 21. This position of the leg is clearly illustrated in FIG. 4. With the leg in this position, the thick bottom portion of element 18 holds the pelt away from notch 21, and separate from the leg in the region adjacent the paw. Foot pedal 38 may then be stepped on to cause the knife blade 24a to move in its cutting stroke toward knife blade 22. This shears the flesh and bone portion of the leg directly adjacent the paw without cutting any portion of the pelt.

The procedure just described for one of the animal's rear legs may then be repeated for its opposite rear leg. A similar procedure may be used in skinning the pelt from the animal's front legs.

Thus, the invention provides relatively simple apparatus which enables rapid removal of an animal's pelt from its legs. Such removal may be accomplished for each leg in one continuous operation, without having to move the animal first to one device which separates the pelt, and then to another device which cuts through the flesh and bone of the leg.

The curvature of element 18, which conforms substantially to the curvature of an animal's leg, facilitates initial separation of the pelt from the leg. The thick base of element 14 holds the pelt away from the leg during cutting.

It will be noted that the movable cutter, more specifically knife blade 24a, on moving in a cutting stroke moves laterally outwardly from element 18 away from the side of element 18 which supports the flesh and bone portion of the leg with the animal prepared as illustrated in FIG. 4. With the animal so prepared the separated pelt extends across the opposite side of element 18. With the knife moved in this direction, and upon approaching knife blade 22, the knife blade tends to move to one side any portions of the pelt where such join with the paw which might lie in the path of the advancing knife. This is a distinct advantage as it eliminates inadvertent cutting away of small portions of pelt in the regions adjacent the paws. Were the knife to be moved in the opposite direction, or from guard 20 toward element 18, this self-clearing action would not be present, and there would be a danger of producing nicks in the pelts.

Since cutting is controlled by a foot pedal, this leaves the operator's hands free to manipulate the animal.

It is appreciated that variations and modifications may be made in the invention without departing from the basic principles thereof, and it is desired to cover all such variations and modifications which would be apparent to one skilled in the art and which come within the scope of the appended claims.

It is claimed and desired to secure by Letters Patent:

1. Apparatus for skinning an animal comprising
   an elongated element adapted to be inserted between the pelt and the flesh and bone portion of an animal's leg, operable when inserted, and on being moved relative to the leg and along the length thereof, to separate the pelt from said flesh and bone portion with the pelt moving toward one side and said portion moving toward the opposite side of said element, and
   a cutter mounted for movement adjacent said elongated element and positioned to one side of said flesh and bone portion with the same disposed on said opposite side of said element, said cutter when actuated moving through said flesh and bone portion with such portion held separate from the pelt by said element.

2. The apparatus of claim 1 wherein said elongated element includes a recess therein extending longitudinally therealong, and said cutter has one position which it assumes prior to actuation where it is received within said recess, and another position to which it moves on actuation of the cutter in a cutting stroke where it protrudes from said recess.

3. The apparatus of claim 2 which further comprises another cutter which is fixed, and spaced from said element and said first-mentioned cutter with the latter in its said one position, and which on movement of the first-mentioned cutter to its said other position produces a cut.

4. The apparatus of claim 2 wherein said cutter is adjacent one end of said elongated element, and said element includes, adjacent its end opposite its said one end, an elongated curvilinear portion which is curved to conform to the cross-sectional curvature of an animal's leg.

5. The apparatus of claim 3 which further comprises a housing, and wherein said elongated element is joined to said housing and said cutters are operatively mounted within said housing.

6. The apparatus of claim 5 wherein said housing includes a guard, and said fixed cutter is positioned within said guard.

7. The apparatus of claim 3 which further comprises actuator means operatively connected to said movable cutter for moving the same.

8. The apparatus of claim 7 wherein said actuator means includes a foot-operated pedal.

9. A method of skinning an animal utilizing an elongated element and a cutter movably mounted adjacent one side of the element comprising.

inserting the element between the pelt and the flesh and bone portion of an animal's leg with the flesh and bone portion disposed on said one side of the element and the pelt disposed on the opposite side of the element, pulling such element along the length of the leg, by such pulling, separating the pelt from the flesh and bone portion along the length of the leg, and with the pelt and the flesh and bone portion of the leg held separate by such element, moving the cutter to cut through the flesh and bone portion of the leg adjacent the paw of the animal.

References Cited

UNITED STATES PATENTS

| | | | |
|---|---|---|---|
| 1,523,465 | 1/1925 | Villemer | 17—43 |
| 2,914,795 | 12/1959 | Lindstrom et al. | 17—21 |
| 2,920,520 | 1/1960 | Duba. | |

LUCIE H. LAUDENSLAGER, *Primary Examiner.*